Patented Apr. 16, 1940

2,197,240

UNITED STATES PATENT OFFICE 2,197,240

CHEWING GUM BASE AND METHOD OF PRODUCTION

George A. Hatherell, Roscoe, Calif., assignor to Frank A. Garbutt, Los Angeles, Calif.

No Drawing. Application March 29, 1938, Serial No. 198,719

9 Claims. (Cl. 99—135)

My invention relates to the compounding of a chewing gum base, more particularly to the production of a chewing gum base of the resin-and-rubber type. The term "rubber" is to be taken as covering lastics in general, including the various synthetic substitutes for natural rubber.

A natural gum base, such as chicle, has as its essential ingredients resin and rubber, and the most successful artificial chewing gum bases are likewise built around resin-like and rubber-like materials. The properties sought in a manufactured synthetic chewing gum base, difficult to describe but well known to those skilled in the art, I have discovered to be determined largely by the physical properties of the resin-like content per se and by the relationship existing between such content and the rubber in the composition.

In chicle the resinous and rubber-like constituents are coagulated by nature substantially independently of each other, the two coagulations being intimately intermeshed so that each breaks up the continuity of the other. For the most part, each of these two essential ingredients remains out of solution with the other, a factor that has an important bearing on the general character of the product, but there is also a certain degree of mutual solution of the two, a factor that likewise has an essential influence on the properties of the product.

It is difficult to separate the effects of these two factors because both seem to be present in any composition of the resin-and-rubber type that will pass for a chewing gum base, but some general observations may be made. The resin per se enters into the resistance to mastication of the chewing gum, the consistency or plasticity of the chewing gum at mouth temperature. On the other hand, the rubber-resin solution present contributes a necessary resiliency factor that varies with the ratio of such solution to the quantity of undissolved resin and rubber. In fact, if there is no mutual solution whatsover the product is too dry and lifeless to be of value.

The ratio of solution must be kept low, however, because otherwise an undesirable property in the finished product is developed, that, in the absence of any standard nomenclature, may be aptly termed the "suction characteristic." By this term is meant an undesirable tendency of the gum to lie close to the teeth with a suction action that may be distinguished from the adhesiveness of a sticky or tacky substance, just as the tendency of two pieces of wet glass to stick together is distinct from the mutual adherence of two objects having a common bond of moist glue. This property is well known to chewing gum manufacturers because it is almost inevitably encountered in experiments performed in the development of a chewing gum base. It is especially troublesome because the obvious expedient of adding ingredients with a view to modifying or neutralizing this characteristic invariably affects other characteristics, introducing new problems and difficulties. If the degree of resin-rubber solution is excessive, the composition becomes too rubbery and bubble-like for a chewing gum of the conventional type.

The central problem of manufacturing a chewing gum base of the type involved here, and the general object of my invention is to provide an intermixture of rubber-like and resin-like materials having the proper proportion of resin-like material of a desired character, the proper proportion of rubber-like material, and the required degree of mutual solution between the two.

That the problem is not simple is attested by the history of the art. The difficulties involved have been inherent in the resins heretofore employed, including, for example, cumarone resins, cyclic aromatic petroleum resins, and various resins extracted from balata, gutta percha, and jelutong. Each of these resins has a fairly definite melting point and has a definite rubber-solubility characteristic, i. e., an unchangeable tendency to enter into solution with rubber to a definite degree in any synthetic process. In general, this tendency to enter into solution increases with the lowering of the melting point of a resin, so that ordinarily a high melting resin must be selected to escape the problem of excessive solution in the finished product. On the other hand, unfortunately, the lower melting resins are indicated as necessary for those properties of chewing gum that are derived from the undissolved resin in the composition. In the manufacturing of chewing gum, the dividing point between high melting and low melting resins may be conveniently set at 85° C. to 90° C., since the problems of utilizing resins melting at substantially above this dividing point differs from the problems of employing resins melting substantially below the dividing point.

Various attempts have been made to meet the dilemma presented by the necessity for choosing between a high melting resin to keep solution in bounds and a low melting resin to give the chewing gum the character required in commerce. The least successful attempts have been in the direction of doctoring a high melting resin with various agents to approximate the physical characteristics of low melting resin. Some measure of success, however, has been achieved by using low melting resins and taking measures to combat the tendency of such resins towards excessive solution. Mixing the rubber and resin under low temperature conditions has been found to afford some retarding effect. The cold milling of a quantity of high melting resin into the rubber prior to the addition of the low melting resin has been found to be a practical expedient. At the present time, the prevailing practice is to add as an inhibiting agent some material that is soluble in resin but less soluble in rubber.

In grappling with these difficulties in the manufacture of chewing gum, those skilled in the art apparently have neither understood the basic problem involved nor appreciated the nature of the resulting dilemma. Rather, they have been aware simply that some conflict is involved in that certain essential properties in a chewing gum are associated with high melting resins and other essential properties are associated with low melting resins and that various expedients with varying success may be employed to compensate for the properties lost by choosing one to the exclusion of the other.

The first step in my invention consists in the discovery of the basic problem, as set forth in the analysis above, and the second step of my invention is in the remedy. The root of the difficulty, as previously noted, has been that no single resin suitable for chewing gum has been known to be characterized by both a low melting point and a low degree of solubility with rubber. It follows from my disclosure of this basic difficulty that by changing the melting point or changing the solution tendency of a suitable resin, either characteristic independently of the other, a resin might be produced with both the desirable properties required for undissolved resin in a chewing gum base and with the desired relatively small inherent tendency to enter into solution with rubber. The aforementioned dilemma would then disappear.

One of the objects of my invention is, in effect, to control the rubber-solubility of a resin independently of its melting point to meet the requirement of chewing gum. Another object is to both simplify the process of manufacturing a chewing gum base and to improve the product thereof by omitting from that process the expedients and materials ordinarily required to control rubber-solubility.

The rubber-solubility characteristic stressed to this point is not to be confused with solubility in organic solvents in general. Solubility in the latter and usual sense is independent of rubber-solubility. A resin, for example, may be completely soluble in petroleum but may have a very low degree of rubber-solubility.

I have discovered that resins produced by polymerizing hydrocarbons in the presence of an acid-acting metallic halide catalyst are suited to the practice of my invention since they may be produced as odorless, tasteless resins of stable character and since the rubber-solubility characteristic of such resins may be controlled. $AlCl_3$ has commonly been used alone as a catalyst in the past, the product being soluble resins intermixed with insoluble substances, the resins being acceptable when isolated for use in a chewing gum base. Hydrocarbons may now, however, be polymerized under conditions resulting in resinous-like materials that are of the proper character to be used in chewing gum substantially in the form produced, the usual concomitant insoluble constituents being largely, if not entirely, avoided. In one procedure, for example, that given in the van Peski Patent No. 2,092,295, hydrocarbons including conjugated double bond diolefines, or mixtures of such diolefines with olefines and/or with aromatic hydrocarbons, are polymerized in the presence of a metallic acid-acting halide such as $AlCl_3$ mixed either with another inorganic halide with a dipole moment such as NaCl, or with an organic compound that possesses a dipole moment and that is capable of forming a complex with the metallic halide, such an organic compound as nitro-benzene, the temperature of the reaction being held preferably between 20° C. and 50° C.

The class of resins suitable for this invention and contemplated in my claims include any mixtures of olefine-diolefine-substituted benzene that polymerize to form resinous substances, the term "olefine-diolefine" being a convenient designation for the resins of this class.

These newer polymerization products of hydrocarbon fractions formed in the presence of a metallic acid-acting halide are usable in a chewing gum base in large or small quantity, depending upon the characteristics of the polymers and the type of chewing gum base desired. The polymers may be derived from a wide variety of olefines and diolefines and may range physically from materials of gummy rubbery quality at one end to materials of highly resinous character at the other end, from products that are quite soft to those that are brittle.

The rubber-solubility of a resin so produced is influenced to various degrees by the particular hydrocarbon fractions or mixtures of fractions selected, by the proportion of conjugated double bond diolefines to olefines or aromatics, by the proportioning of constituents in a complex catalyst, and, finally, by distillation subsequent to polymerization.

The flexibility of these newer polymerization processes makes it possible to control the rubber-solubility of the polymerization product to such an extent that a resin may be produced with any inherent rubber-solubility desired. Thus, by manipulation of the various factors indicated above, such a polymerization process may be pointed to the production of an ideal low melting resin having approximately the degree of rubber-solubility that corresponds to the proportion of resin-rubber solution desired in a chewing gum base.

With the information already available in the art, a skilled operator may choose his materials and manipulate the polymerization process to produce resins suitable for a chewing gum base. Some general observations, however, may be helpful.

The rubber-solubility characteristic and the general character of the resin may be most readily influenced by varying the raw materials. As an example of a marked change in the final product produced by a relatively small change in the starting materials, it may be noted that while special diolefines such as the simple homologues of butadiene polymerized alone produce well known rubber-like substances, other materials such as mono-olefines may be added in relatively small quantity to cause a shift from rubber-like to resin-like properties. A material having utility in chewing gum may be so produced.

I prefer, however, in seeking a suitable resin-like material for chewing gum, to employ one of two fractions of drastically cracked petroleum distillate, or a mixture of the two fractions, as the basis of my starting material. The first of these fractions boils between 25° C. and 60° C. and contains among other active agents $C_5H_8$ and $C_5H_{10}$ hydrocarbons, straight chain olefines and diolefines, and varying proportions of $C_5H_6$ cyclic diolefines such as cyclopentadiene. Such a fraction is very rich in diolefines. The second fraction boils between 125° C. and 180° C. and contains large proportions of hydrocarbons of the formula $C_{10}H_{12}$, polymers of cyclic diolefines, some polymers of the low straight chain olefines and diolefines and cyclic olefines. Where relatively low rubber-solubility in the resultant resin is sought, I lean towards the higher boiling fraction to favor larger molecules with heterogeneous linking.

Various additions may be made to my basic mixture to influence the hardness of the resultant resin substantially independently of the rubber-solubility characteristic. Thus, I may favor softness in the resultant resin by increasing the proportion of olefines. I may add to my basic mixture for this purpose either a pure olefine or a hydrocarbon fraction containing substantial proportions of an olefine, the only restrictions being that substituted benzenes be avoided. As an example of a pure olefine, amylene may be added in amount varying from one-tenth of the basic mixture to an amount equal to or larger than the basic mixture, the lower ratios being preferable. The expense of adding such a pure olefine may be avoided, for example, by adding a fraction containing hexane from the vapor phase cracking of paraffin to give the mol quantity of mono-olefine desired. The effect of adding olefines to the basic mixture of material follows from the fact that an olefine polymerized alone produces an oil rather than a solid or semi-solid substance. Olefines condense with substituted aromatics but not with benezene, the resultant compounds being of high molecular weight. I have found, however, that the presence of substituted aromatics give highly unsaturated products that readily oxidize and readily react with such materials as flavors in a chewing gum base. Consequently any substantial quantity of the substituted aromatics is undesirable.

The polymerization may be carried out in the presence of inert solvents such as benzene, cyclohexane, or any saturated paraffinic compounds, but in any case every polymerization must be carried to its limit, the catalyst usually being added until there is no further effect on the reacting mixture. The effect of incomplete polymerization is similar to the effect of excessive quantities of substituted aromatics, the product exhibiting unsaturation.

Such a resin in which the melting point is controlled by manipulation of the factors of polymerization may be employed alone as substantially the total resinous content of a chewing gum base, thus making it possible to produce a superior chewing gum base without resorting to any expedient or added material to retard or inhibit the formation of resin-rubber solution in the chewing gum. For example, substantially the total resinous content of a resin-and-rubber type of chewing gum may comprise a product having a melting point of 65° C. obtained by polymerizing an olefine-diolefine mixture of hydrocarbon fractions boiling below 50° C., the polymerization being carried out in the presence of $AlCl_3$ combined with nitro-benzene as a catalyst. As an example of a formula of this type, I may employ 50 parts of low melting resin-material (65° C.) obtained by polymerizing an olefine-diolefine fraction as indicated, 15 parts of rubber, 5 parts of carnauba wax, and 5 parts of tallow (mutton) or the equivalent of cocoa butter or the like. The chewing gum may be compounded by mixing the resin, wax and tallow in melted state into the rubber in any suitable manner known to the art, for example, by the use of rolls. Other materials known to the art may be added.

In addition to the procedure just described, my concept includes a second more flexible practice in which the required rubber-solubility characteristic in the resinous content of the chewing gum base is attained by blending two low melting resins to get a resultant solubility characteristic, as distinguished from relying solely on manipulating the conditions of polymerization of a single resin. The blending of low melting resins to provide the resinous content of a chewing gum base is not to be confused with the various prior art practices of mixing low melting resins with high melting resins. It is to be emphasized that the properties sought in a chewing gum base of first qualtiy are associated with low melting resins and that any addition of high melting resin is at a cost of quality in the gum not entirely avoidable by the addition of any modifying agents to the mixture. In my practice of blending suitable low melting resins, I may concentrate my attention on the attainment of a resultant solubility characteristic in the knowledge that considerable latitude may be had with relatively little effect on the general character of the final chewing gum, so long as the blending is confined to low melting resins. To my knowledge such a practice derived from my study of the problems of chewing gum manufature is new in the art.

A feature of this second practice of my invention is that the solubility characteristic attained by controlling polymerization factors is not critical, since such characteristic is subject to correction by blending. For example, if resin formed by hydrocarbon polymerization in the presence of a metallic halide is to form the entire resinous content of a chewing gum base, two complementary batches may be drawn on for blending, one produced under conditions insuring a higher rubber-solubility characteristic than desired in the chewing gum base and the other produced under conditions insuring a lower rubber-solubility characteristic than desired. The proportion in which the two batches are to be blended may be determined by sample mixes or both batches may be tested for solubility ratings from which the proper proportioning may be derived.

The blended resins may comprise one resin produced by hydrocarbon polymerization in the presence of a metallic halide and one resin selected from those heretofore utilized in this art. Since all of the suitable low melting resins heretofore employed in the art, including natural resins and synthetic resins, such as cumarone resin and the cyclic aromatic petroleum resins, are characterized without exception by too high rubber-solubility, the new resin will necessarily have a relatively low degree of rubber-solubility.

As an example of this second practice, I may take a resin melting at approximately 65° C. obtained by polymerizing an olefine-diolefine mixture in the presence of $AlCl_3$-nitro-benzene, or other suitable catalyst, and combine therewith one or more of the old low melting resins to form the resinous content of my chewing gum base. Thus, I may employ 50 parts of the new low melting resin and 15 parts of jelutong resin, in which combination either constituent may be regarded as correcting or compensating the rubber-solubility characteristic of the other to produce a resultant predetermined rubber-solubility characteristic. The chewing gum may be completed in the usual manner by adding 15 parts of rubber, 5 parts of carnauba wax, and 5 parts of mutton tallow and other materials known to the art.

Since jelutong itself contains rubber, I am enabled with the new type of resin to compound a chewing gum base without including rubber as a separate ingredient. Thus, I may use 50 parts of the olefine-diolefine resin, 30 parts of jelutong, and 20 parts of such ingredients as hangkang, gutta katian, hard fat, or other supplementary substances known to the art.

It is apparent that processes of producing a chewing gum base incorporating olefine-diolefine resins may be quite flexible. By adding increasing amounts of the more gummy polymerization products of the olefine-diolefine processes, I have been able to cut down the amount of rubber in the chewing gum base progressively to the point of producing a chewing gum base containing no rubber whatsoever additional to rubber-like olefine-diolefine polymers.

For the purposes of the present disclosure, I have given preferred ingredients and proportions which may be modified by those skilled in the art without departing from the principles of my invention. I reserve the right to all such changes and modifications that properly come within the scope of my appended claims.

I claim as my invention:

1. A chewing gum base containing an olefine-diolefine resin.

2. A chewing gum base containing one or more low melting resins with a relatively low rubber-solubility characteristic, and one or more low melting resins with a higher rubber-solubility characteristic, said resins being proportioned to provide a combined low melting resin having a resultant inherent rubber-solubility characteristic corresponding to the degree of resin-rubber solution required in the chewing gum base, at least one of said resins containing hydrocarbon polymers of diolefines formed in the catalytic presence of a metallic acid-acting halide.

3. A chewing gum base of the resin-and-rubber type in which the resinous ingredient has a low melting point and an inherent rubber-solubility characteristic corresponding to the proportion of resin-rubber solution required in the base and contains polymers of diolefines.

4. A chewing gum base containing an olefine-diolefine resin and rubber.

5. A chewing gum base containing an olefine-diolefine resin and jelutong.

6. A chewing gum base containing olefine-diolefine resin and natural gums.

7. A chewing gum base containing olefine-diolefine resin as a major ingredient and a natural gum as a minor ingredient.

8. In the manufacture of a chewing gum base of the resin-and-rubber type, a method of obtaining a required degree of resin-rubber solution in the final product, said method being characterized by the mixing with rubber of a resin having a rubber-solubility characteristic corresponding with said degree and containing hydrocarbon polymers of diolefines formed in the catalytic presence of a metallic acid-acting halide.

9. In the manufacture of a chewing gum base of the resin-rubber type, a method of obtaining a required degree of resin-rubber solution in the final product without employing expedients to retard the inherent tendency of the resin to enter into solution with the rubber, said method comprising intermixing two low melting resins having different rubber-solubility characteristics to attain a resultant rubber with an intermediate inherent rubber-solubility characteristic corresponding to said required degree of resin-rubber solution prior to intermixing the resinous and rubber-like ingredients of the chewing gum base, at least one of said resins containing hydrocarbon polymers of diolefines formed in the catalytic presence of a metallic acid-acting halide.

GEORGE A. HATHERELL.